United States Patent [19]
Lacey

[11] Patent Number: 4,729,697
[45] Date of Patent: Mar. 8, 1988

[54] MILLING CUTTER

[75] Inventor: Ralph W. Lacey, Grosse Pointe Parke, Mich.

[73] Assignee: Dijet Inc., Harper Woods, Mich.

[21] Appl. No.: 875,471

[22] Filed: Jun. 18, 1986

[51] Int. Cl.$^4$ ............................................. B26D 1/00
[52] U.S. Cl. ........................................ 407/42; 407/48; 407/58; 407/114
[58] Field of Search .................. 407/36, 42, 48, 58, 407/113, 114

[56]  References Cited
U.S. PATENT DOCUMENTS

| | | | |
|---|---|---|---|
| 3,421,196 | 1/1969 | Reich | 407/113 |
| 3,762,005 | 10/1973 | Erkfritz | 407/113 |
| 3,818,562 | 6/1974 | Lacey | 407/113 |
| 4,182,587 | 1/1980 | Striegl | 407/113 |
| 4,531,863 | 7/1985 | Smith | 407/113 |
| 4,531,864 | 7/1985 | Bylund | 407/114 |
| 4,573,831 | 3/1986 | Lacey | 407/42 |
| 4,585,375 | 4/1986 | Erkfritz | 407/114 |

FOREIGN PATENT DOCUMENTS 2938381  4/1980  Fed. Rep. of Germany ...... 407/113

Primary Examiner—Fred Silverberg
Attorney, Agent, or Firm—Price, Heneveld, Cooper, DeWitt & Litton

[57] ABSTRACT

A milling cutter comprises a cutter body having at least one insert blade station. At least one insert blade is operably connected with the cutter body at the insert blade station. The insert blade has opposite side faces, and a plurality of peripheral edge faces, with at least one cutting edge formed at the intersection of one side face and one edge face. The insert blade is oriented in the cutter body such that the one edge face defines a tooth face against which a workpiece impinges during cutting, and the one side face defines a clearance space between the insert blade and the workpiece. The one side face is convex in shape to reduce the clearance space for improved cutting efficiency and blade longevity, without causing undesirable contact between the other portions of the insert blade and the workpiece.

20 Claims, 10 Drawing Figures

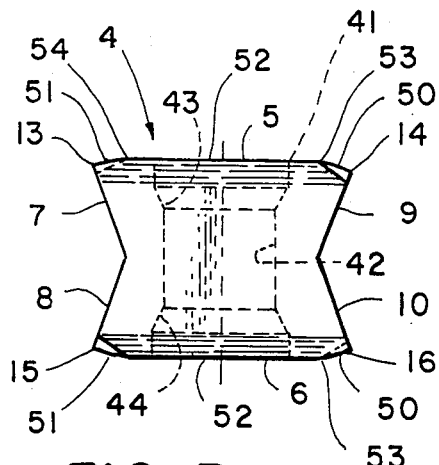

MILLING CUTTER

BACKGROUND OF THE INVENTION

The present invention relates to metal cutters, and the like, and in particular to a milling cutter having at least one blade.

Milling cutters are used extensively in high speed machining operations, and typically include a cutter body, with removable, indexable insert blades. One such milling cutter is disclosed in my prior U.S. Pat. No. 4,573,831, issued Mar. 4, 1986, entitled CUTTER BLADE, which is hereby incorporated by reference.

A problem has been encountered with the use of such milling cutters in the machining of high carbon steels, such as die steels, and the like. In order to achieve improved cutting efficiency, it is necessary to reduce the relief or clearance space between the insert blades and the workpiece. Heretofore, the clearance space has been reduced by tilting the trailing edge or heel of the insert blades radially outwardly, as shown in a greatly exaggerated condition in FIG. 9 of the appended drawings. However, such a tilted orientation of the insert blades in the cutter body causes the heels of the blades to contact and rub or drag against the workpiece as the cutter body rotates. This heel drag would make cutting the metal an impossibility.

Those problems noted above are particularly prevalent when using relatively thick, indexable insert cutters. Also, the difficulties experienced in reducing the clearance space to provide improved cutting efficiency for die steels and the like is exacerbated as the diameter of the cutter body becomes smaller, as in the case of end mills.

SUMMARY OF THE INVENTION

One aspect of the present invention is to provide a milling cutter which has a reduced clearance space for improved cutting efficiency and insert blade longevity, without causing undesirable contact between the other portions of the insert blades and the workpiece. The milling cutter comprises a cutter body adapted for axial rotation with respect to a workpiece. At least one blade is operably connected with the cutter body, and includes at least one side face, and at least one peripheral edge face, which intersect to form a cutting edge. The blade is oriented in the cutter body such that the edge face defines a tooth face against which the workpiece impinges during cutting, and the side face defines a clearance space between the blade and the workpiece. The side face is convex in shape to achieve the reduced clearance space, without causing heel drag.

Another aspect of the present invention is to provide an improved insert blade for milling cutters of the type having a cutter body with a plurality of stations at which removable, indexable insert blades are mounted. The insert blades each have opposite side faces, and a plurality of peripheral edge faces which intersect to form cutting edges. At least one of the side faces of each insert blade is convex to reduce the clearance space and simultaneously increase heel clearance, whereby improved cutter efficiency and insert blade longevity is achieved.

The principal objects of the present invention are to provide a milling cutter having improved cutting efficiency and cutting action. The milling cutter includes a cutter body, and at least one cutter blade with convex clearance faces which reduce the clearance space, and increase heel clearance. The blade may be in the form of a removable, indexable insert, and is capable of being used in conjunction with a wide variety of different diameter cutter bodies, and cutter arrangements. The milling cutter is particularly adapted for use as an end mill, and other similar applications when the blades rotate at a relatively short radius. The milling cutter has an uncomplicated construction, and the orientation of the blade presents an extremely strong blade position. The milling cutter is also economical to manufacture, and is particularly well adapted for the proposed use.

These and other features, advantages, and objects of the present invention may be further understood and appreciated by those skilled in the art by reference to the following written specification, claims, and appended drawings.

BRIEF DESCRIPTION OF THE DRAWINGS

FIG. 1 is an enlarged, fragmentary, cross-sectional view of a milling cutter embodying the present invention.

FIG. 2 is an enlarged, rear elevational view of an insert blade portion of the milling cutter.

FIG. 3 is an enlarged, end view of the insert blade.

FIG. 4 is an enlarged, top plan view of the insert blade.

FIG. 5 is an enlarged, bottom plan view of the insert blade.

DETAILED DESCRIPTION OF THE PREFERRED EMBODIMENTS

Figure 6:
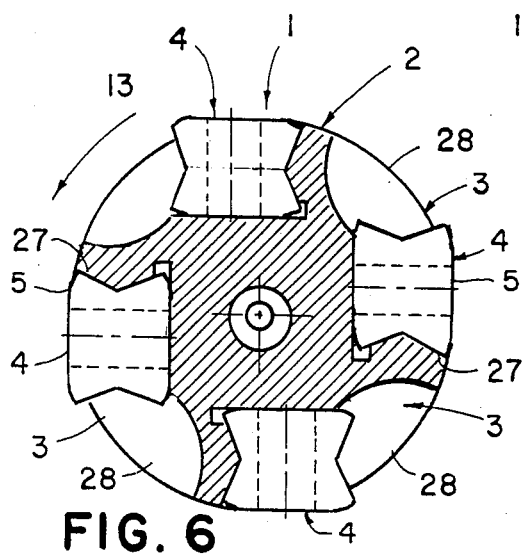
FIG. 6 is a transverse cross-sectional view of the milling cutter.

For purposes of description herein, the terms "upper," "lower," "right," "left," "rear," "front," "vertical," "horizontal" and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions, and other physical characteristics relating to the embodiments disclosed herein, are not to be considered as limiting, unless the claims by their language expressly state otherwise.

The reference numeral 1 (FIG. 1) generally designates a milling cutter embodying the present invention. Milling cutter 1 comprises a cutter body 2 having at least one insert blade station 3. At least one insert blade 4 is operably connected with cutter body 2 at insert blade station blade 3. Insert blade 4 has opposite side faces 5 and 6, and a plurality of peripheral edge faces 7-12, with at least one cutting edge 13 formed at the intersection of one of the side faces 5 and 6, and one of the edge faces 7-12. In the illustrated example, insert blade 4 includes four cutting edges 13-16. Each insert blade 4 is oriented in cutter body 2 such that at the exposed cutting edge, such as edge 13, the associated edge face, such as front face 7, defines a tooth face against which the workpiece 17 impinges as milling cutter 1 rotates during cutting, and the associated side face, such as side face 5, defines a relief or secondary clearance space 18 between the associated insert blade 4 and workpiece 17. Side face 5 is generally convex in shape, with radially outwardly extending surfaces in the nature of a convex surface or convex facets to reduce clearance space 18 for improved cutting efficiency and insert blade longevity, without causing undesirable contact between the other portions of insert blade 4 and workpiece 17, such as heel drag, or the like.

The term "convex," as used herein, means any shape which extends or bulges radially outwardly from insert blade 4 toward workpiece 17 to reduce clearance space 18. Hence, the convex shape of the selected one of side face 5 and 6 may be achieved by a single arcuate convex surface (not shown), by a plurality of intersecting planar surfaces arranged in a convex polygon, as employed in the illustrated embodiment, or by any combination or other variation of the same, as will be appreciated by those having ordinary skill in the art.

Figure 7:
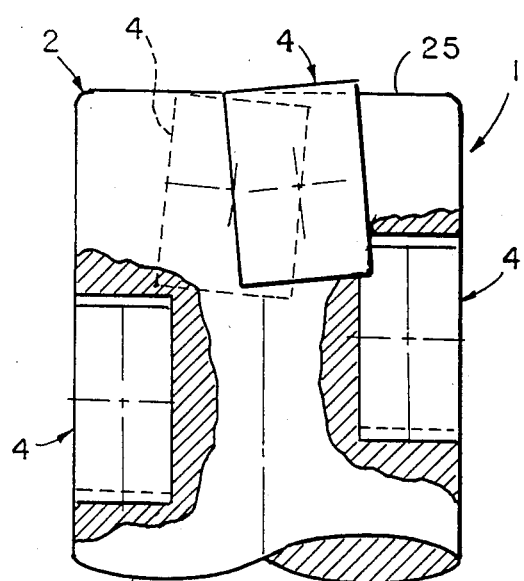
FIG. 7 is a fragmentary, side elevational view of the milling cutter, with portions thereof broken away to reveal internal construction.
Figure 8:
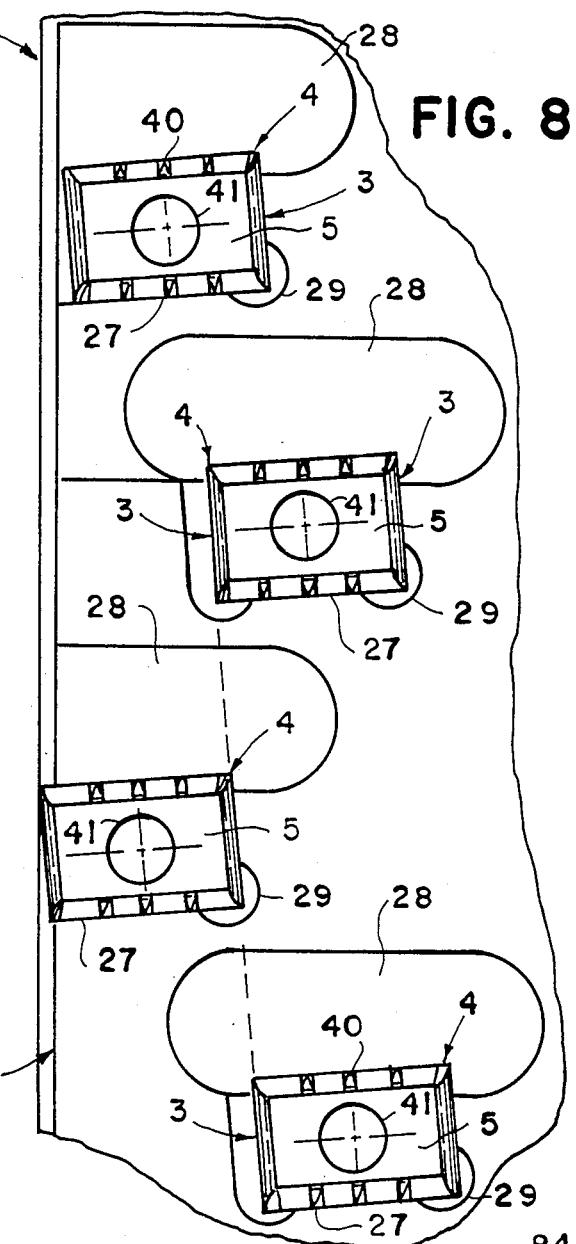
FIG. 8 is a developed view of the milling cutter.

With reference to FIGS. 6-8, the illustrated milling cutter 1 is an end mill, wherein cutter body 2 is in the shape of a rod or shaft, having insert blade stations 3 located at an outer end 25 thereof. The opposite end 26 of cutter body 2 is adapted to be mounted in a chuck, or other similar retaining portion of a milling machine (not shown) to rotate milling cutter 1 about the longitudinal axis of cutter body 2. In the illustrated example, cutter body 2 has four insert blade stations 3, which are spaced regularly about the periphery of cutter body 2, and are staggered or offset longitudinally, as best illustrated in the developed view shown in FIG. 8. Each insert blade station 3 includes a blade pocket 27 shaped to receive an associated insert blade 4 therein, and a chip pocket 28. The lower, inside corner of each blade pocket 27 includes an arcuate groove 29 to insure that the adjacent edge of the insert blade 4 mounted therein does not contact outter body 2, and thereby provides a wedging type of mounting action for insert blades 4. In one end mill embodiment of milling cutter 1, cutter body 2 has an outside diameter in the range of ¾ to 1½ inches, with insert blade stations 3 extending from the outer end 25 of cutter body 2 inwardly therefrom approximately 4 or more inches.

As best illustrated in FIG. 1, each insert blade station 3 includes a base 32, with a threaded aperture 33 therein to mount insert blades 4 in the manner discussed below. In the illustrated milling cutter 1, the longitudinal axis of aperture 33 is disposed substantially parallel with radial axis 34 of cutter body 2, and is laterally spaced apart from the longitudinal axis 35 of cutter body 2 a predetermined distance toward chip pocket 28.

The illustrated milling cutter 1 includes four identical insert blades 4 that are mounted on cutter body 2 at associated insert blade stations 3. As best illustrated in FIG. 8, when insert blades 4 are mounted in cutter body 2 at insert blade stations 3, they are staggered longitudinally, with end faces 11 and 12 overlapping, so as to present a continuous cutting edge to workpiece 17.

Since insert blades 4 are identical, the following detailed description of insert blades 4 will be referenced to a single blade, as illustrated in FIGS. 1-5. Except as identified hereinafter, the illustrated insert blade 4 is substantially similar to the insert blade disclosed in my prior U.S. Pat. No. 4,573,831, such that each of the cutting edges 13-16 (FIGS. 1-5) of insert blade 4 include notches 40 therethrough to break the chips formed during the cutting of workpiece 17. Insert blade 4 is removable and indexable, and includes a central aperture 41, having a central bore area 42 with countersunk ends 43 and 44 at opposite ends thereof. Central aperture 41 is non-threaded, and is adapted to receive therein a threaded fastener 45, having a tapered head 46 which mates in either end 43 o 44 of central aperture 41. Fastener 45 is threadedly connected with a mating aperture 33 in cutter body 2, and serves to retain insert blade 4 securely in blade pocket 27.

At least one side of one of the side faces 5 and 6 is convex, extending radially outwardly toward the cut wall 48 of workpiece 17 to reduce clearance space 18. Furthermore, by making both sides of the selected one of side faces 5 and 6 convex, not only is the clearance space 18 decreased, but the clearance on the heel, or opposite edge 14, of insert blade 4 is simultaneously increased. This feature is particularly beneficial in indexable insert blades, since the opposite sides of the insert blade must be identical anyway to insure proper indexing. However, it is to be understood that the present invention contemplates use in conjunction with milling cutters whose blades are either not removable, and/or not indexable.

In the illustrated example of the present invention, the side faces 5 and 6 of insert blade 4 each comprise three, generally flat or planar, intersecting clearance surfaces 50-52, in the shape of a convex polygon. The center clearance surfaces 52 are disposed generally perpendicular with the central axis of aperture 41, and are generally parallel to the base surface 32 of blade pocket 27. Outer clearance surfaces 50 and 51 intersect center clearance surfaces 52 along clearance edges 53 and 54, and extend outwardly therefrom to the associated cutting edges 13-16, and are inclined inwardly with respect to center clearance surfaces 52, such that the included angles between each pair of clearance surface 50 and 51 and its related or associated center clearance surface 52 is less than 180 degrees. In the illustrated example, which has four separate cutting edges 13-16, the clearance surfaces 50 and 51 on opposite side faces 5 and 6 of insert blade 4 converge toward each other at the associated cutting edges 13 and 15 and 14 and 16. The inclined relationship between clearance surfaces 50-52 imparts a convex shape to the side faces 5 and 6 of insert blade 4 which is generally in the shape of a regular trapezoid to providing dual clearance. This convex shape reduces the clearance space 18, while at the same time increases heel clearance to eliminate heel drag. In one working embodiment of the present invention, the included angle between center clearance surfaces 52 and adjacent outer clearance surfaces 50 and 51 is in the range of 178 to 173 degrees. In other words, clearance surfaces 50 and 51 are angled with respect to the associated one of the center clearance surface 52 by an angle in the nature of 5 degrees. However, it is to be understood that the included angle between center clearance surfaces 52 and adjacent outer clearance surfaces 50 and 51 may be varied to accommodate different milling applications. The included angle may be varied particularly with respect to the radius at which insert blades 4 are rotated during cutting, but will not in any event be 180 degrees or more.

In operation, an insert blade 4 is mounted on cutter body 2 at each insert blade station 3. Fasteners 45 are inserted through the central aperture 41 of each of the insert blades 4, and threaded into cutter body apertures 33 to securely retain the same in place. In the orientation illustrated in FIG. 1, cutter body 2 is rotated in a counterclockwise direction, shown by the illustrated arrow, such that cutting edge 13 impinges upon workpiece 17, as cutter body 2 rotates. In this orientation front face 7 forms the tooth face of insert blade 4, and clearance surfaces 50 and 52 form one side of radial clearance space 18, the other side of which is defined by the wall 48 which is cut in workpiece 17 by insert blade 4.

Figure 9:
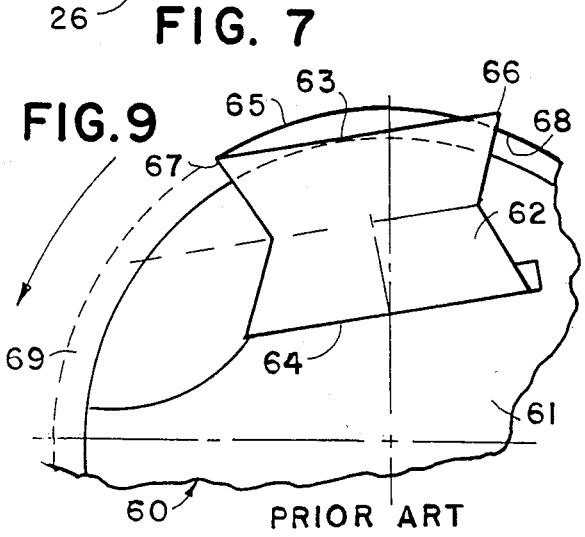
FIG. 9 is a schematic illustration of a prior milling cutter arrangement, wherein the insert blade positioned with proper clearance, is positioned in a tilted orientation in an associated cutter body, and wherein the tilted orientation of the insert blade has been greatly exaggerated for illustrative purposes.

FIG. 9 illustrates a prior milling cutter 60, having a cutter body 61, and an insert blade 62. Unlike the convex side faces 5 and 6 of the present milling cutter 1, the side faces 63 and 64 of insert blade 62 are flat. In the milling cutter 60 shown in FIG. 9, insert blade 62 has been tilted or angled in cutter body 61 an exaggerated amount, so that the associated clearance space 65 is substantially commensurate with the clearance space 18 of milling cutter 1, as shown in FIG. 1. In the greatly exaggerated, angled position shown in FIG. 9, the trailing cutting edge or heel 66 of insert blade 62 is tipped radially outwardly from the leading cutting edge 67, so that heel 66 will rub or drag along the wall 68 of the workpiece 69 being cut. The amount of heel drag experienced in the exaggerated condition shown in FIG. 9 would prevent milling cutter 60 from working properly.

As is apparent from a comparison of FIG. 1 and FIG. 9, the convex shape of intersecting surfaces 50, 51 and 52 on the side faces 5 and 6 of the present insert blades 4 not only reduces the clearance space 18, but also positions the trailing cutting edge or heel 14 of insert cutters 4 a spaced apart distance from the cut wall 55 of the workpiece, and angles the same, so as to eliminate any heel drag.

Figure 10:
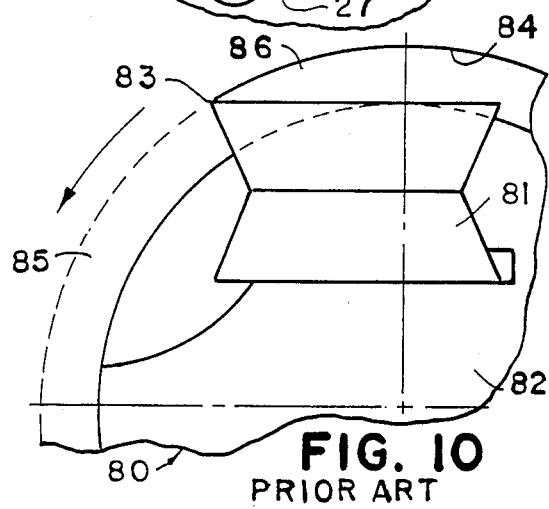
FIG. 10 is a schematic illustration of another prior milling cutter arrangement, wherein the insert blade is positioned in a laterally offset condition in an associated cutter body.

In the milling cutter 80 shown in FIG. 10, insert blade 81 has been moved laterally outwardly, or offset from the longitudinal axis of the associated cutter body 82 to avoid heel drag, or contact between the trailing cutting edge 83, and the wall 84 of workpiece 85. However, the outward lateral translation of insert blade 81 greatly increases the associate clearance space 86 reducing cutting efficiency.

Milling cutter 1 provides greatly improved cutting efficiency, increased insert blade longevity, and eliminates heel drag by virtue of the convex shape of side faces 5 and 6 with intersecting surfaces 50, 51 and 52, which form triple clearance surfaces. Insert blades 4 can be used in conjunction with a wide variety of different diameter cutter bodies, and is particularly economical to manufacture.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The embodiments of the invention in which an exclusive property or privilege is claimed are defined as follows:

1. An end milling cutter, comprising:
   an elongate cutter body having upper and lower ends, and being adapted for axial rotation with respect to a workpiece; said cutter body having at least one insert blade station disposed at the lower end of said cutter body;
   at least one insert blade operably connected with said cutter body at said insert blade station; said insert blade having opposited side faces, and a plurality of peripheral edge faces, with at least one rectilinear cutting edge only formed at the outermost intersection of one of said side faces and one of said edge faces that is sufficiently continuous to form non-threaded bores in the workpiece; said insert blade being oriented in said cutter body such that said one edge face defines a tooth face against which the workpiece impinges during cutting, and said one side face defines a clearance space between said insert blade and the workpiece; said tooth face having at least a portion thereof protruding axially downwardly from the lower end of said cutter body, and said one side face of said insert blade being substantially convex in shape and extending radially outwardly from said at least one cutting edge to another of said edge faces to reduce the clearance space for improved cutting efficiency and insert blade longevity, without causing undesirable contace between other portions of said insert blade and the workpiece.

2. An end milling cutter as set forth in claim 1, wherein:
   said one side face includes substantially planar, first and second clearance surfaces, which are mutually inclined.

3. End milling cutter as set forth in claim 2, wherein:
   said first and second clearance surfaces are oriented with an included angle therebetween of 178 to 172 degrees.

4. An end milling cutter as set forth in claim 3, wherein:
   said insert blade is indexable, and includes a second cutting edge substantially similar to said at least one cutting edge formed on said one side face, opposite said at least one cutting edge.

5. An end milling cutter as set forth in claim 4, wherein:
   said insert blade includes third and fourth cutting edges substantially similar to said at least one and second cutting edges formed at the intersection of the other one of said side faces, and associated edge faces.

6. An end milling cutter as set forth in claim 5, wherein:
   said insert blade station has a radially oriented centerline; and
   said insert blade is laterally offset from said centerline in a direction toward the workpiece.

7. An end milling cutter as set forth in claim 6, wherein:
   said cutting edges each have intersecting faces mutually inclined at an included angle therebetween of less than 90 degrees.

8. An end milling cutter as set forth in claim 1, wherein:

said insert blade is indexable, and includes a second cutting edge substantially similar to said at least one cutting edge formed on said one side face, opposite said at least one cutting edge.

9. An end milling cutter as set forth in claim 8, wherein:
said insert blade includes third and fourth cutting edges substantially similar to said at least one and second cutting edges formed at the intersection of the other one of said side faces, and associated edge faces.

10. An end milling cutter as set forth in claim 1, wherein:
said insert blade station has a radially oriented centerline; and
said insert blade is laterally offset from said centerline in a direction toward the workpiece.

11. An end milling cutter as set forth in claim 1, wherein:
said one side face and said one edge face intersect with an included angle therebetween of less than 90 degrees.

12. An insert for end milling cutters, and the like of the type including an elongate cutter body having at least one insert blade station positioned at a lower end thereof, and being adapted for axial rotation with respect to a workpiece; said insert blade comprising:
opposite side faces, and a plurality of peripheral edge faces, with at least one rectilinear cutting edge only formed at the outermost intersection of one of said side faces and one of said edge faces that is sufficiently continuous to form non-threaded bores in the workpiece; said insert blade being adapted for positioning the cutter body at the insert blade station in a selected orientation therein, wherein said one edge face defines a tooth face against which the workpiece impinges during cutting, and said one side face defines a clearance space between said insert blade and the workpiece; said tooth face having at least a portion thereof protruding axially downwardly from the lower end of said cutter body, and said one side face of said insert blade being substantially convex in shape and extending radially outwardly from said at least one cutting edge to another of said edge faces to reduce the clearance space for improved cutting efficiency and insert blade logevity, without causing undesirable contact between other portions of said insert blade and the workpiece.

13. An insert blade as set forth in claim 12, wherein:
said one side face includes substantially planar, first and second clearance surfaces, which are mutually inclined.

14. An insert blade as set forth in claim 13, wherein:
said first and second clearance surfaces are oriented with an included angle therebetween of 178 to 173 degrees.

15. An insert blade as set forth in claim 14, wherein:
said insert blade is indexable and includes a second cutting edge substantially similar to said at least one cutting edge formed on said one side face, opposite said at least one cutting edge.

16. An insert blade as set forth in claim 15, wherein:
said insert blade includes third and fourth cutting edges substantially similar to said at least one and second cutting edges formed at the intersection of the other one of said side faces, and associated edge faces.

17. An insert blade as set forth in claim 16, wherein:
said cutting edges each have intersecting faces mutually inclined at an included angle therebetween of elss than 90 degrees.

18. An insert blade as set forth in claim 12, wherein:
said insert blade in indexable, and includes a second cutting edge substantially similar to said at least one cutting edge formed on said one side face, opposite said at least one cutting edge.

19. An insert blade as set forth in claim 18, wherein:
said insert blade includes third and fourth cutting edges substantially similar to said at least one and second cutting edges formed at the intersection of the other one of said side faces, and associated edge faces.

20. An insert blade as set forth in claim 12, wherein:
said one side face and said one edge face intersect with an included angle therebetween of less than 90 degrees.

* * * * *

UNITED STATES PATENT AND TRADEMARK OFFICE
CERTIFICATE OF CORRECTION

PATENT NO. : 4,729,697

DATED : March 8, 1988

INVENTOR(S) : Ralph W. Lacey

It is certified that error appears in the above-identified patent and that said Letters Patent is hereby corrected as shown below:

Column 1, line 48:
"faoe" should be --face--;

Column 3, line 1:
after "station" delete --blade--;

Column 3, line 49:
"outter" should be --cutter--;

Column 6, line 12:
"opposited" should be --opposite--;

Column 6, line 32:
"contace" should be --contact--;

Column 6, line 39:
"End milling" should be --An end milling--;

Column 8, line 28:
"elss" should be --less--.

Signed and Sealed this

Tenth Day of January, 1989

*Attest:*

DONALD J. QUIGG

*Attesting Officer*   *Commissioner of Patents and Trademarks*